(12) United States Patent
Roberts et al.

(10) Patent No.: US 10,402,327 B2
(45) Date of Patent: Sep. 3, 2019

(54) NETWORK-AWARE CACHE COHERENCE PROTOCOL ENHANCEMENT

(71) Applicant: Advanced Micro Devices, Inc., Sunnyvale, CA (US)

(72) Inventors: David A. Roberts, Boxborough, MA (US); Ehsan Fatehi, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 121 days.

(21) Appl. No.: 15/358,318

(22) Filed: Nov. 22, 2016

(65) Prior Publication Data

US 2018/0143905 A1 May 24, 2018

(51) Int. Cl.
| | |
|---|---|
| *G06F 12/08* | (2016.01) |
| *G06F 12/0815* | (2016.01) |
| *G06F 12/084* | (2016.01) |
| *G06F 12/0817* | (2016.01) |
| *G06F 13/16* | (2006.01) |

(52) U.S. Cl.
CPC ........ *G06F 12/0815* (2013.01); *G06F 12/084* (2013.01); *G06F 12/0822* (2013.01); *G06F 13/1615* (2013.01); *G06F 2212/314* (2013.01); *G06F 2212/621* (2013.01)

(58) Field of Classification Search
CPC .. G06F 12/08; G06F 12/0815; G06F 12/0822; G06F 12/084
USPC .......................................... 711/167, 160, 128
See application file for complete search history.

(56) References Cited

U.S. PATENT DOCUMENTS

| | | | |
|---|---|---|---|
| 6,775,749 B1 | 8/2004 | Mudgett et al. | |
| 7,363,435 B1 | 4/2008 | Stenstrom | |
| 2007/0255908 A1 | 11/2007 | Zeffer et al. | |
| 2008/0022051 A1* | 1/2008 | Osanai ............... | G06F 12/0811 711/138 |
| 2008/0201532 A1* | 8/2008 | Chaudhary ......... | G06F 12/0862 711/142 |
| 2008/0235746 A1* | 9/2008 | Peters ................ | H04N 7/17318 725/111 |
| 2008/0270454 A1 | 10/2008 | Davis et al. | |

(Continued)

OTHER PUBLICATIONS

Shubhendu S. Mukherjee, Mark D. Hill, "Using Prediction to Accelerate Coherence Protocols", Proceedings of the 25th Annual International Symposium on Computer Architecture, Jun. 27-Jul. 2, 1998; 12 pages.

(Continued)

*Primary Examiner* — Pierre Miche Bataille (57) ABSTRACT

A non-uniform memory access system includes several nodes that each have one or more processors, caches, local main memory, and a local bus that connects a node's processor(s) to its memory. The nodes are coupled to one another over a collection of point-to-point interconnects, thereby permitting processors in one node to access data stored in another node. Memory access time for remote memory takes longer than local memory because remote memory accesses have to travel across a communications network to arrive at the requesting processor. In some embodiments, inter-cache and main-memory-to-cache latencies are measured to determine whether it would be more efficient to satisfy memory access requests using cached copies stored in caches of owning nodes or from main memory of home nodes.

20 Claims, 5 Drawing Sheets

(56) References Cited

U.S. PATENT DOCUMENTS

| | | |
|---|---|---|
| 2010/0205408 A1 | 8/2010 | Chung |
| 2011/0320738 A1* | 12/2011 | Blake .................. G06F 12/0831 |
| | | 711/141 |
| 2012/0084525 A1* | 4/2012 | Jegu .................... G06F 13/1663 |
| | | 711/163 |
| 2014/0181417 A1 | 6/2014 | Loh et al. |
| 2014/0258622 A1 | 9/2014 | Lacourba et al. |
| 2017/0109060 A1* | 4/2017 | Kim ...................... G06F 3/0611 |
| 2017/0181417 A1 | 6/2017 | Tsybulnyk |
| 2017/0185351 A1* | 6/2017 | Guim Bernat .......... G06F 12/02 |
| 2017/0212694 A1* | 7/2017 | Chen .................... G06F 12/0246 |
| 2018/0157589 A1 | 6/2018 | Jayasena et al. |

OTHER PUBLICATIONS

Non-Final Office Action dated Dec. 27, 2017 for U.S. Appl. No. 15/370,734 17 pages.

Notice of Allowance dated Aug. 29, 2018 for U.S. Appl. No. 15/370,734 27 pages.

\* cited by examiner

DIRECTORY 300

| ADDRESS | MODIFIED/ OWNED? | NODE 1 CACHE | NODE 2 CACHE | NODE 3 CACHE | ... | NODE N CACHE | |
|---|---|---|---|---|---|---|---|
| 0x3545FF | 0 | 1 | 1 | 1 | ... | 0 | ~302 |
| 0x354500C | 0 | 1 | 1 | 0 | ... | 0 | ~304 |
| 0x8000FF | 1 | 0 | 0 | 0 | ... | 1 | ~306 |

FIG. 3

LATENCY TABLE 400

| REQUESTOR | NODE 2 CACHE | NODE 2 MAIN MEMORY | NODE 3 CACHE | NODE 3 MAIN MEMORY | NODE N CACHE | NODE N MAIN MEMORY | |
|---|---|---|---|---|---|---|---|
| NODE 1 | 30 ns | 50 ns | 60 ns | 80 ns | 90 ns | 110 ns | ~402 |

NETWORK-AWARE CACHE COHERENCE PROTOCOL ENHANCEMENT

GOVERNMENT LICENSE RIGHTS

This invention was made with government support under Prime Contract Number DE-AC52-07NA27344, Subcontract No. B608045 awarded by DOE. The Government has certain rights in this invention.

BACKGROUND

Description of the Related Art

Non-uniform memory access (NUMA) architecture is a computer memory design where memory access times to different memory modules vary, based on a number of factors including the type of memory module and the proximity of a processor to the memory module being accessed. The NUMA architecture often includes several nodes that each have one or more processors, caches, local main memory in each node, and a local bus on each node that connects a node's processor(s) to its memory. The processors, caches and memory in each node of a NUMA system are typically mounted to the same circuit board or card to provide relatively high speed interaction between all of the components that are local to a node. The nodes are also coupled to one another over a network such as a system bus or a collection of point-to-point interconnects, thereby permitting processors in one node to access data stored in another node. Accesses to memory at a remote node typically have a greater latency than accesses to local memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As discussed with respect to FIGS. 1-6 herein, although it is often faster to request memory accesses from caches, the non-uniform memory access times of NUMA systems (e.g., due to memory access requests traversing an interconnect network connecting the nodes of the NUMA system) can result in instances where it can be faster to access data from main memory in its home node rather than from a cached location. To illustrate, memory accesses to data from main memory, and storing data back into main memory, is generally performed at a slower rate than the rate at which data is accessed from a cached location. However, with long chains of nodes, a request from one end of the chain can be satisfied by a main memory of a node in the middle of the chain before a cache at the end of the chain. Accordingly, the relative latencies of accesses to main memory and caches can be determined at each node for determining whether it would be faster to access data via cache lines or main memory. In some embodiments, inter-cache and main-memory-to-cache latencies are measured to determine whether it would be more efficient to satisfy memory access requests using cached copies stored in caches of owning nodes or from main memory of home nodes. In some embodiments, a copy of data is retrieved from memory in the home node if it is determined that inter-cache latency is higher than the main-memory-to-cache latency.

Figure 1:
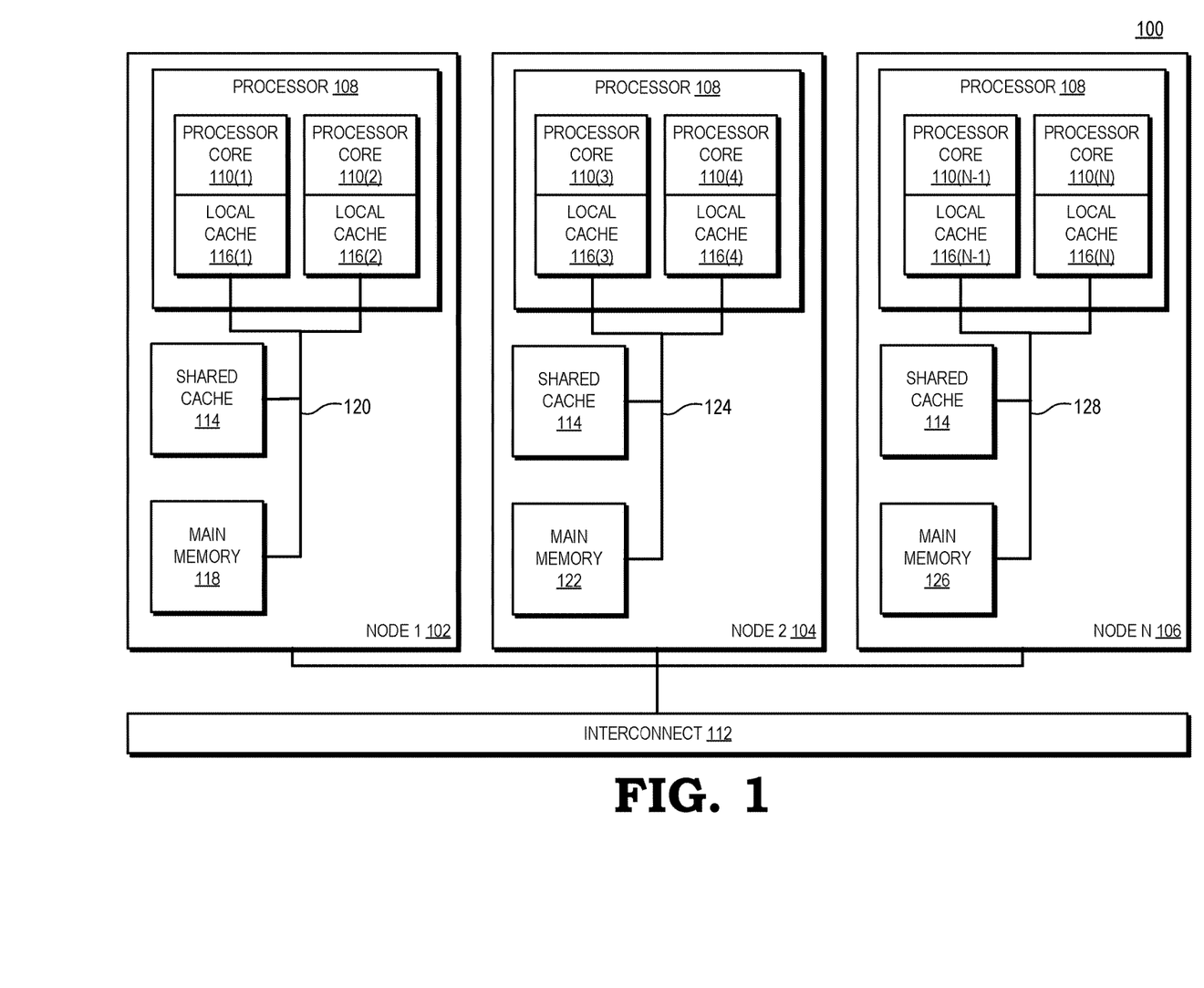
FIG. 1 is a block diagram of an example system implementing non-uniform memory access (NUMA) architecture according to some embodiments.

FIG. 1 is a block diagram illustrating an example of a system 100 implementing non-uniform memory access (NUMA) architecture. The NUMA system 100 includes N number of nodes 102-106. Each node 102-106 can be any computing device, such as a server, a workstation, a desktop computer, a notebook computer, a tablet computer, an accelerated processing unit (APU), and the like. In FIG. 1, each node 102-106 includes a processor 108 having one or more processor cores 110, and a main memory 118, 122, and 126 for nodes 102, 104, and 106, respectively. The nodes 102-106 are connected together by an interconnect network 112. The interconnect network 112 can be implemented using any suitable electrical, optical or wireless technology, and can include any number of topologies, from dedicated point-to-point connections, to single switch implementations, to packet or circuit switched networks of varying complexity, or to any combination thereof. Thus, multiple nodes 102-106 can communicate via the interconnect network 112 coupled there between.

Each processor core 110 can be a processor core of a microprocessor, central processing unit (CPU), or the like. Some processor cores can be different processing cores of a processing device incorporated into a single integrated circuit. Other processor cores can be components of a multi-chip module (e.g., in which separate microprocessor dies are included within a single package). Alternatively, the processor cores can have distinct dies and packaging, and be connected via an interposer or other interface circuitry. Although the system 100 shown in FIG. 1 includes two processor cores 110 for each processor 108, persons of ordinary skill in the art having benefit of the present disclosure should appreciate that the number of processor cores in the system 100 is a matter of design choice. In some embodiments, the system 100 includes more or fewer than the two processor cores 110 for each processor 108.

Each node 102-106 includes a shared main memory (e.g., main memories 118, 122, and 126 for nodes 102-106, respectively), one or more processor cores 110, and one or more levels of cache memory such as a shared cache 114 and one or more local caches 116. Primary caches (i.e., those used to store most frequently used information by processor cores) will be referred to generically herein as "local caches", whereas secondary caches (i.e., those used to store less frequently used information than a local cache, such as L2 caches, L3 caches, etc.) that are used to store at least some information stored in the primary caches of two or more processor cores shall be referred to generically herein as "shared caches". The local caches 116 can include a level one ("L1") cache, or other memory structure from which the processor cores 110 retrieve frequently accessed information quickly relative to other memory structures in the nodes.

Each node 102-106 also includes a secondary cache memory (i.e., shared cache 114), such as a level two ("L2") cache memory, or other memory structure from which it retrieves less frequently accessed information less quickly than compared to a primary cache memory but faster than from the main memory, such as dynamic random access memory (DRAM), hard-drive memory, etc. The local caches 116 store information that is to be primarily used by the processor cores to which they correspond. The shared caches 114 can be used by more than one processor core. In some embodiments, the shared caches 114 can store all or some portion of information stored in each of the local caches 116, such that multiple local caches 116 store a subset of frequently used information stored in the shared cache memory. The caches 116 are utilized to temporarily store data from main memory when that data is being used by the processor cores 110. These caches 116 are often smaller in size, but significantly faster, than the main memory. The main memory can be shared between the nodes 102-106 and data stored within main memory is generally accessible to all processor cores 110 via request transactions issued on interconnect 112.

The processor cores 110 of each node are coupled to each other via a local bus. As shown in FIG. 1, node 1 includes processor core 110(1) with its local cache 116(1) and processor core 110(2) with its local cache 116(2). Main memory 118 of node 1 is coupled to the processor cores 110(1) and 110(2) via its local bus 120. Node 2 includes processor core 110(3) with its local cache 116(3) and processor core 110(4) with its local cache 116(4). Main memory 122 of node 2 is coupled to the processor cores 110(3) and 110(4) via its local bus 124. Similarly, each of the other nodes through node N has processor cores 110(N−1) and 110(N) coupled to their respective main memories via a local bus (e.g., main memory 126 of node N is coupled to processor cores 110(N−1) and 110(N) via local bus 128).

The usage of multiple threads (e.g., due to system 100 using multiple processors, multiple cores processor, or both) introduces complexity into cache management. Different threads in the processor cores 110 accessing the same data each may have their own private copy of the data in their respective local caches 116. In order to avoid processing errors, the different copies of the data must be kept consistent, or "coherent." Accordingly, cache coherence protocols (e.g., MSI, MESI, MOSI, MOESI, MERSI, MESIF, etc.) are used to keep different caches synchronized. The controllers for the various caches (e.g., local caches 116) enforce the cache coherence protocol, thereby preserving the consistency of memory across all memory within system 100.

In some NUMA system embodiments, the address space of the main memories (e.g., main memories 118, 122, and 126) can be allocated amongst the various nodes. Each address in the address space of the main memories is assigned to their respective nodes, and is referred to as the "home node" of the address. A processor within a different node than the home node may access the data at an address of the home node, potentially caching the data within its local cache. Data corresponding to addresses stored in remote nodes may be cached in any of the local caches 116 or within the shared cache 114 of each node. When considered as a whole, the main memory (e.g., main memory 118, 122, and 126) included within the multiple nodes (e.g., nodes 102-106) form the shared memory for the NUMA system 100.

Each processor core 110 is able to access a combined memory space including its own local memory (e.g., local cache 116 and main memory co-located at the same node) and remote memory formed by main memory residing at the other nodes. The memory accesses between nodes are non-uniform (that is, have a different latency) with intra-node memory accesses because accesses to remote memory take longer to complete than accesses to local memory due to the requests traveling across the interconnect 112. Thus, the hardware within each node is characterized by being able to communicate more efficiently with modules of the same node than interacting or communicating with hardware of other nodes. In some embodiments, processor core 110(1) within node 1 may have lower latency access to the memory that is local (i.e., a memory resident in the same node as the processor core 110(1)) to that node (e.g., main memory 118) as compared to access to a remote (i.e., non-local) memory.

In some embodiments, such as illustrated in FIG. 1, main memory (e.g., main memories 118, 122, and 126) operate as the principal working storage for the system 100. Retrieving data from main memory, and storing data back into main memory, however, is often performed at a slower rate than the rate at which data is accessed from caches 116 or 114. Although it is often faster to request and access data from the caches, the non-uniform memory access times of NUMA systems can result in instances where it can be faster to access data from main memory in its home node rather than from a cached location. Data is generally transferred between main memory and caches in fixed-size blocks called "cache lines." As used herein, "cache line" generally refers to a unit of memory. However, one of skill in the art will recognize that the scope of this disclosure is not limited to cache lines, and can also include any alternative unit of memory, such as blocks, pages, segments, etc.

In an embodiment, if processor core 110(1) of node 1 (e.g., the requesting node) requests a read access to a cache line stored within local cache 116(N) of node N and the home node (i.e., the node that stores memory and coherence state for the cache line in question) for that memory location is within node 2, it can be faster to access the data from main memory 122 due to its proximity to the requesting node (i.e., node 1) if N is large and positioned far along a chain of nodes away from the requesting node. Thus, an inter-cache request can have a higher latency than retrieving a copy of the data from main memory.

In the NUMA system 100 of FIG. 1, adding nodes along a chain configuration is often employed as a means of capacity expansion. With long chains of nodes, a request from one end of the chain can sometimes be satisfied by a main memory of a node in the middle of the chain before a cache at the end of the chain. Although described here in the context of a chain configuration, one of ordinary skill in the art will recognize that system 100 can include nodes of any physical and/or logical topology (e.g., rings, stars, trees, etc.). The relative latencies of accesses to main memory and caches can be determined at each node for determining whether it would be more efficient to access data via cache lines or main memory. In some embodiments, each node 102-106 includes a directory (not shown in FIG. 1) that is used to identify which nodes have cached copies of data corresponding to a particular address in main memory. The directories maintain information regarding the current sharers of a cache line in system 100 and track latency times for memory access requests to main memory and to caches containing copies of data cached from the main memory of the processing node in which it resides.

In some embodiments, the directories each include a latency table that maintains a list of latencies associated with cache-to-cache transfer transactions (i.e., inter-cache latencies) and main-memory-to-cache transfer transactions (i.e., main-memory-to-cache latencies). As used herein, a cache-to-cache or inter-cache transfer refers to a transfer of data (or an address thereof) between cache memories of different nodes (e.g., from cache memory of an owner node to cache memory in the requesting node). A main-memory-to-cache transfer refers to a transfer of data from main memory to cache memory of a requesting node. Based on a determination that the inter-cache latency is higher than the main-memory-to-cache latency (e.g., it would be faster to access data from main memory instead of a cached copy), a copy of data associated with the memory access request can be retrieved from main memory in its home node instead of from a cached location. In some embodiments, a directory residing in node 1 102 can determine that requesting memory access to a cached copy of data in local cache 116(N) of node N would have a higher latency than requesting the data from its copy in the main memory 122 of node 2. Based on that determination, the memory access request can be fulfilled faster by retrieving the data from main memory in its home node (e.g., node 2) than from its cached copy in node N.

Figure 2:
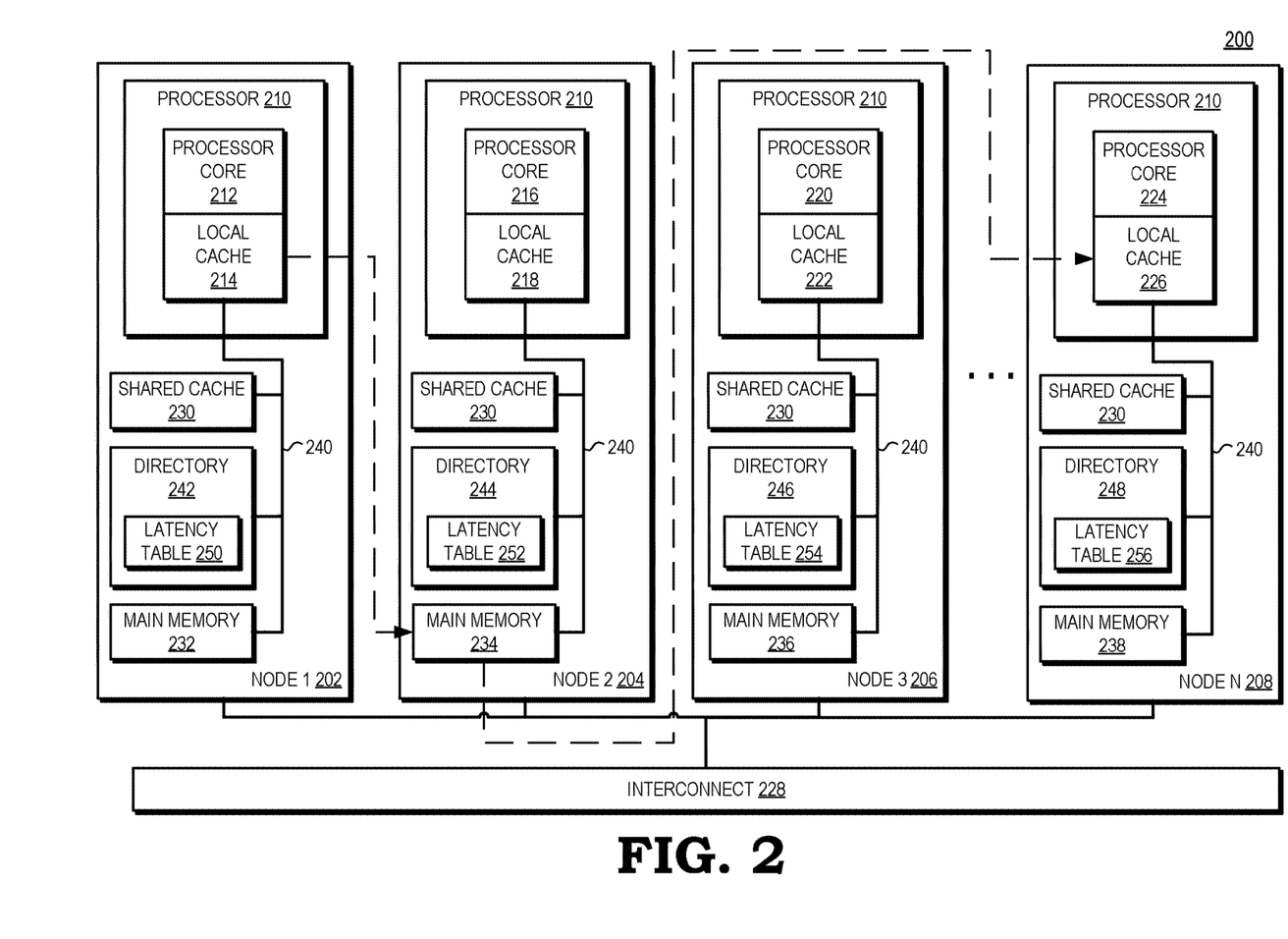
FIG. 2 is a block diagram illustrating an example NUMA system that includes a number of nodes according to some embodiments.

FIG. 2 is a block diagram illustrating an example of a NUMA system 200 that includes N number of nodes 202-208. Each node 202-208 can be any computing device, such as a server, a workstation, a desktop computer, a notebook computer, a tablet computer, an accelerated processing unit (APU), and the like. In FIG. 2, each node 202-206 includes a processor 210 having a processor core and a local cache. Node 1 includes a processor core 212 and a local cache 214; node 2 includes a processor core 216 and a local cache 218; node 3 includes a processor core 220 and a local cache 222; and so forth through node N including a processor core 224 and a local cache 226. The nodes 202-208 are connected together by an interconnect network 228. The interconnect network 228 can be implemented using any suitable electrical, optical or wireless technology, and can include any number of topologies, from dedicated point-to-point connections, to single switch implementations, to pack or circuit switched networks of varying complexity, or to any combination thereof. Thus, multiple nodes 202-208 can communicate via the interconnect network 228 coupled there between.

Each processor core (e.g., processor cores 212, 216, 220, and 224) can be a processor core of a microprocessor, central processing unit (CPU), or the like. Some processors can be different processing cores of a processing device that consists of a single integrated circuit. Other processors can be components of a multi-chip module (e.g., in which separate microprocessor dies are included within a single package). Alternatively, the processors can have distinct dies and packaging, and be connected via circuitry. Although the system 200 shown in FIG. 1 includes one processor core for each processor 210, persons of ordinary skill in the art having benefit of the present disclosure should appreciate that the number of processor cores in the system 200 is a matter of design choice. In some embodiments, the system 200 can include more than one core for each processor 210.

Each node 202-208 includes a shared main memory (e.g., main memory 232, 234, 236, and 238 for nodes 202-208, respectively) and one or more levels of cache memory such as a primary cache (e.g., local caches 214, 218, 222, and 226) and a secondary cache. Primary caches (i.e., those used to store most frequently used information by processor cores) will be referred to generically herein as "local caches", whereas secondary caches (i.e., those used to store less frequently used information than a local cache, such as L2 caches, L3 caches, etc.) that are used to store at least some information stored in the primary caches of two or more processor cores shall be referred to generically herein as "shared caches." The local caches 214, 218, 222, and 226 can include a level one ("L1") cache, or other memory structure from which the processor cores retrieves frequently accessed information quickly relative to other memory structures in the nodes.

Each node 202-208 also includes a secondary cache memory (i.e., shared cache 230), such as a level two ("L2") cache memory, or other memory structure from which it retrieves less frequently accessed information less quickly than compared to a primary cache memory but faster than from the main memory, such as dynamic random access memory (DRAM), hard-drive memory, etc. The local caches 214, 218, 222, and 226 store information that is to be primarily used by the processor cores to which they correspond. The shared caches 230 can be used by more than one processor core. The local caches 214, 218, 222, and 226 are utilized to temporarily store data from main memory when that data is being used by the processor cores. These local caches are often smaller in size, but significantly faster, than main memory. The main memory can be shared between the nodes 202-208 and data stored within main memory is generally accessible to all processor cores 212, 216, 220, and 224 via request transactions issued on interconnect network 228.

As shown in FIG. 2, node 1 includes processor core 212 with its local cache 214. Main memory 232 of node 1 is coupled to its processor core 212 via a local bus 240. Node 2 includes processor core 216 with its local cache 218. Main memory 234 of node 2 is coupled to its processor core 216 via a local bus 240. Node 3 includes processor core 220 with its local cache 222. Main memory 236 of node 3 is coupled to its processor core 220 via a local bus 240. Similarly, each of the other nodes through node N has a processor core coupled to their respective main memories via a local bus (e.g., main memory 238 of node N is coupled its processor cores 224 and local cache 226 via local bus 240).

In some NUMA system embodiments, the address space of the main memories can be divided amongst the various nodes. Each address in the address space of the main memories is assigned to their respective nodes, and is referred to as the "home node" of the address. A processor within a different node than the home node may access the data at an address of the home node, potentially caching the data within its local cache. In some embodiments, data corresponding to addresses stored in remote nodes may be cached in any of the local caches 214, 218, 222, or 226, or alternatively within the shared cache 230 of each node. When considered as a whole, the main memory (e.g., main memories 232-238) included within the multiple nodes (e.g., nodes 202-208) forms the shared memory for the NUMA system 200.

In some embodiments, the systems described herein utilize the MESI coherence protocol in which every cache line is marked with one of four different coherence states. The "M" refers to the Modified state, wherein a cache with the data in the Modified state has the only valid copy of the cache line and has made changes to that copy. The "E" refers to the Exclusive state, wherein a cache has the only copy of the cache line (e.g., similar to Modified), but the cache line is clean (i.e., unmodified). The "S" refers to the Shared state, wherein a cache line is one of several copies in the system.

This cache does not have permission to modify the copy. Other processors in the system may hold copies of the data in the Shared state, as well. The "I" refers to the Invalid state, wherein the data in the cache line is not valid; any attempted access should be satisfied from main memory.

In other embodiments, the systems described herein utilize the MOESI coherence protocol. MOESI is similar to the above-described MESI protocol, but further includes an Owned state representing data that is both modified and shared. The Owned state represents a cache line that is one of several with a valid copy of the cache line, but has the exclusive right to make changes to it. The Owned cache line must broadcast those changes to all other caches sharing the line. Owned state allows dirty sharing of data, i.e., a modified cache block can be moved around various caches without updating main memory. The cache line may be changed to the Modified state after invalidating all shared copies, or changed to the Shared state by writing the modifications back to main memory. Under the MOESI protocol, a shared cache line may be dirty with respect to memory; if it is, some cache has a copy in the Owned state, and that cache is responsible for eventually updating main memory. If no cache holds the line in the Owned state, the memory copy is up to date. The cache line may not be written, but may be changed to the Exclusive or Modified state after invalidating all shared copies.

Typically, directories (e.g., directories 242-248 for nodes 1-N, respectively) are used to identify which nodes have cached copies of data corresponding to a particular address in main memory. Coherency activities may be generated via examination of the directories 242-248. In some embodiments, a directory coherence protocol is utilized that relies on point-to-point messaging between nodes. Addresses are interleaved across the nodes; each address is assigned to a home node that is responsible for ordering and handling all coherence requests to that address. With directory protocols, cache line requests are routed through the home node. The home node has visibility of the owning cache for each cache line and communication patterns to the cache lines for the range of memory addresses tracked by the home node's directory.

The directories 242-248 maintain information regarding the current sharers of a cache line in system 200, as well as coherence state information. The directories 242-248 can include static random-access memory (SRAM) that is attached to the main memories of each node or can alternatively be a portion of the main memory (e.g., DRAM) that is reserved for directory purposes. In one embodiment, as further illustrated below in FIG. 3, each entry in a directory includes an address value, a bit value representing modified/owned status, and a set of bit values that each represent a possible sharing cache. The directories 242-248 each include a latency table (e.g., latency tables 250-256) that maintains a list of latencies associated with cache-to-cache transfer transactions and main-memory-to-cache transfer transactions. As used herein, a cache-to-cache transfer refers to a transfer of data (or an address thereof) between cache memories of different nodes (e.g., from cache memory of an owner node to cache memory in the requesting node). A main-memory-to-cache transfer refers to a transfer of data from main memory to cache memory of a requesting node.

Figure 3:
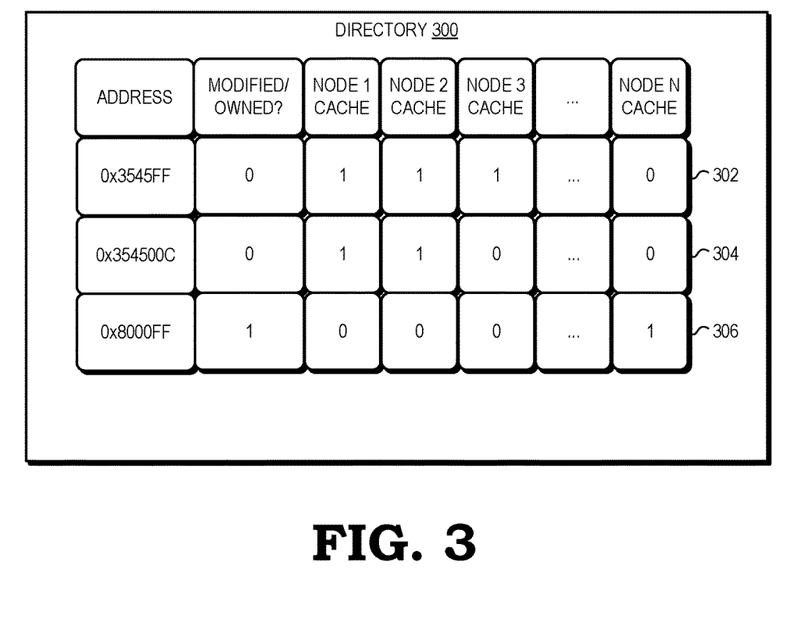
FIG. 3 is a block diagram of a node directory according to some embodiments.

As illustrated in FIG. 3, the directory includes a number of entries 302-306. Entry 302 corresponds to a main memory address of 0x3545FF, entry 304 corresponds to a main memory address of 0x354500C, and entry 306 corresponds to a main memory address of 0x8000FF. Each entry includes a bit value representing modified/owned status. To maintain system coherence, there can only be one modified or owned copy of each cache line in the system. Accordingly, when the bit value representing modified/owned status is set to "1," the remainder of the bits in an entry operate as a pointer to the cache containing the modified or owned copy of the cache line. As illustrated in FIG. 3, entry 306 for the cache line having a memory address of 0x8000FF has a modified or owned copy. The bit value for node N is set to "1" to indicate the cache of that node has the modified or owned copy. However, when the bit value representing modified/owned status is set to "0," the remainder of the bits in an entry operate as an indicator of which caches have a clean copy of the data at that address. As illustrated in FIG. 3, entry 302 has the bit values corresponding to nodes 1-3 all set to "1." Each of the caches for nodes 1-3 have a clean copy of the cache line for memory address 0x3545FF. Similarly, entry 304 has the bit values corresponding to nodes 1-2 set to "1." Each of the caches for nodes 1-2 have a clean copy of the cache line for memory address 0x354500C.

Referring now back to FIG. 2, although it is often faster to request and access data from the caches, the non-uniform memory access times of NUMA systems can result in instances where it can be faster to access data from main memory in its home node rather than from a cached location. In some embodiments, if processor core 212 of node 1 (i.e., requesting node) requests a read to data cached in local cache 226 of node N (i.e., owning node), the latency table 252 in the owning node of that requested data (i.e., node 2) can be used to determine whether it would be faster to satisfy the read request using a copy of the data in main memory 234 of node 2 rather than its cached copy in node N. As further described herein and further in reference to FIG. 4, the latency table 252 maintains a list of latencies associated with cache-to-cache transfer transactions and main-memory-to-cache transfer transactions.

In one embodiment, the latency tables 250-256 are populated by using a heuristic to approximate inter-cache latencies and main-memory-to-cache latencies. The approximations can be determined based on, for example, each directory's knowledge of node topology in the NUMA system 200, access times to cache or main memory, and transmit times across interconnect network 228. In other embodiments, the latency tables 250-256 are populated by sending probe messages from each processor and measuring the delay from request to return acknowledgement from each cache and main memory in each node. In one embodiment, each node in the NUMA system 200 broadcasts cache probe requests (e.g., a read and/or a write probe) to the cache memory and main memory of all other nodes. In response to the cache probe requests, the cache memory and main memory of each node will return one or more return responses to the requesting node. For example, for a read probe, the caches can return a cache hit or a cache miss to indicate whether the requested data is found within cache memory. The latency tables 250-256 are populated by latency entries that record latency times from the start of a cache probe request to when the response is received. Based on the values stored within the latency tables 250-256, it can be determined whether it would be more efficient to retrieve a copy of the requested data from main memory in its home node or from a cached copy in an owning node.

Figure 4:
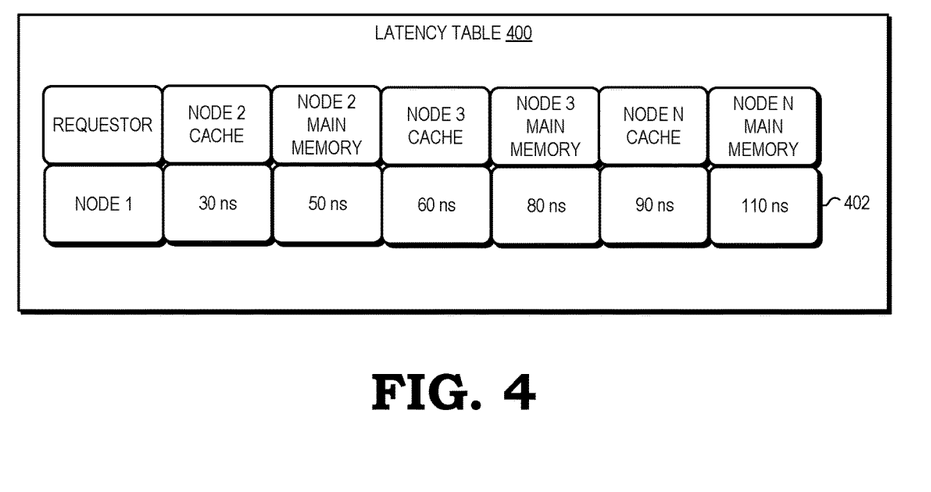
FIG. 4 is a block diagram of an example latency table associated with accesses to different caches and main memories according to some embodiments.

FIG. 4 illustrates a block diagram of an example latency table 400 (e.g., latency table 252 of FIG. 2 as discussed above) of latencies associated with accesses to different caches and main memories. As shown in entry 402, the latency between a requesting node 1 and main memory in the home node (i.e., node 2) is 50 ns, which is less than latency between node 1 and a cached copy in the cache of node N at 90 ns. Accordingly, it would be faster to satisfy the data requesting using a copy of the requested data from main memory in the home node. Therefore, for a memory access request from the requesting node 1, the system will provide a copy of the requested data from main memory 234 of node 2 (with a latency time of 50 ns) rather than from a cached copy of the requested data in cache 226 of cache N (with a latency time of 90 ns).

Figure 5:
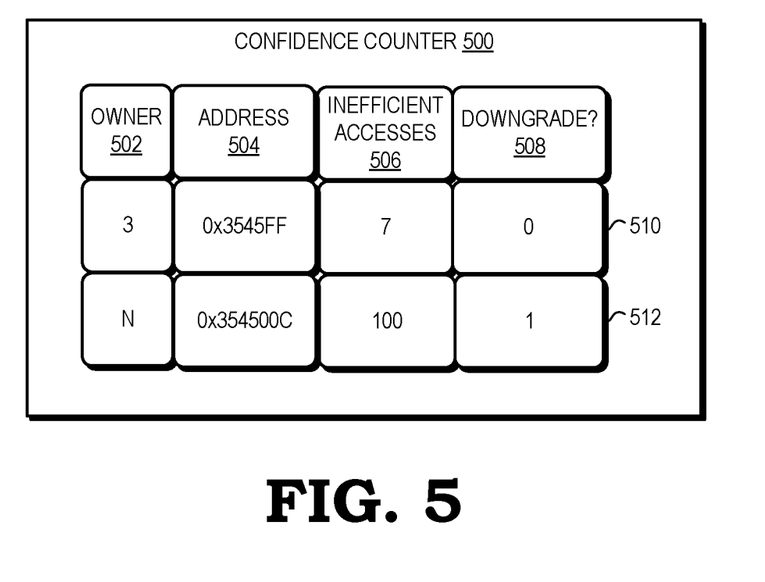
FIG. 5 a block diagram of an example confidence counter according to some embodiments.

In some embodiments, the directory of each home node also includes a confidence counter for monitoring inefficient accesses to owned cache lines. FIG. 5 illustrates a block diagram of an example confidence counter 500 according to some embodiments. The confidence counter 500 tracks the number of reads that have been supplied by an inefficient owner. The confidence counter 500 tracks the owner nodes 502 having cached copies of data from address 504. Based on the number of inefficient accesses 506 exceeding a predetermined threshold number, the confidence counter 500 can determine whether the owner node should be downgraded using the downgrade bit 508. As illustrated in FIG. 5, at entry 510, the cached copy of data from address 0x3545FF has been inefficiently accessed seven times (e.g., such as by the determination discussed with regards to FIGS. 2-4). This does not exceed the predetermined threshold number (not specified), and the downgrade bit 508 is set to "0." At entry 512, the cached copy of data from address 0x354500C at node N has been inefficiently accessed 100 times. This exceeds the predetermined threshold number and the downgrade bit 508 is set to "1." The indicates that the system is experiencing a large number of inefficient accesses and that system performance can be improved by downgrading the owner status of the cached copy in node N to the shared state, which causes the owner to write back its data to main memory. After downgrading, future reads will be more efficiently satisfied by providing the data from main memory instead of a cached copy.

Figure 6:
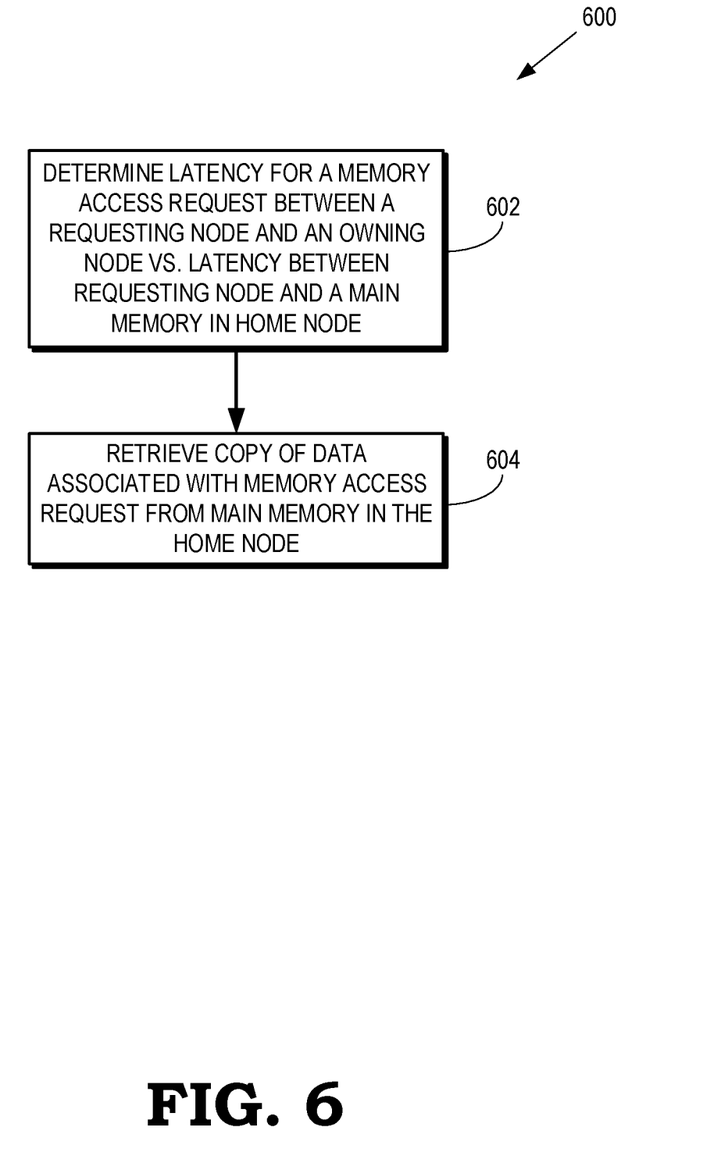
FIG. 6 is a flow diagram illustrating a method of determine relative main memory and cache latencies according to some embodiments.

FIG. 6 is a flow diagram illustrating a method 600 of determine relative main memory and cache latencies in NUMA systems, such as the systems 100 and 200 of FIGS. 1 and 2, according to some embodiments.

At block 602, the inter-cache latency for a memory access request between a requesting node and an owning node relative to a main-memory-to-cache latency between the requesting node and a main memory in a home node is determined. In one embodiment, such as described relative to FIGS. 2 and 4, the latency can be determined on the basis of a latency table stored at a directory of each node that maintains a list of latencies associated with cache-to-cache transfer transactions and main-memory-to-cache transfer transactions. In one embodiment, the latency tables are populated by using a heuristic to approximate inter-cache latencies and main-memory-to-cache latencies. The approximations can be determined based on, for example, each directory's knowledge of node topology in the NUMA system 200, access times to cache or main memory, and transmit times across the interconnect between nodes. In other embodiments, the latency tables are populated by sending probe messages from each processor and measuring delay from request to return acknowledgement from each cache and main memory in each node. Based on the values stored within the latency tables, it can be determined whether it would be more efficient to retrieve a copy of the requested data from main memory in its home node or from a cached copy in an owning node. At block 604, based on a determination that the inter-cache latency is higher than the main-memory-to-cache latency (e.g., it would be faster to access data from main memory instead of a cached copy), a copy of data associated with the memory access request is retrieved from the main memory in the home node.

One of ordinary skill in the art will recognize that although the relative memory and cache latency determination embodiments are described in the context of the node directories, other embodiments can include determinations that originate in the requesting processor/cache ("snooping protocols"). In such embodiments, a requesting cache broadcasts read requests to all other caches. If read request corresponds to a cached line in the owned state, the owner indicates in its response that it is an owner. Thus, the requesting cache recognizes that the response is being received from an owning cache instead of from main memory. If it is determined that response took too long (e.g., such as using the various techniques described herein), the requesting cache can request a downgrade to the coherence status of the owning cache such that future read requests for that data in the cached line will come from main memory.

Many advantages can be gained by implementing the system and methods described herein. For example, in some embodiments, non-volatile memory can have varying latencies depending on the addresses being accessed or latency to the same address can change over time, such as due to degradation as the memory location is repeatedly accessed. The tracking of memory access latencies to different cache and memory locations enables the system to account for these effects, which may be occurring system-wide or within individual memory devices.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system, comprising:
a plurality of processing nodes interconnected by an interconnect network, wherein each processing node comprises a cache, a main memory, and a directory, wherein the directory of at least one of the plurality of processing nodes tracks main-memory-to-cache latencies for memory access requests from a requesting node of the plurality of processing nodes to the main memory and inter-cache latencies for memory access requests from the requesting node to caches containing copies of data cached from the main memory of the at least one of the plurality of processing nodes; and
wherein the requesting node is configured to selectively retrieve data from the main memory responsive to determining that a main-memory-to-cache latency for a memory access request associated with the data is lower than the inter-cache latencies represented in the directory.

2. The system of claim 1, wherein the directory at each of the plurality of processing nodes further includes a latency table that stores inter-cache latency and main-memory-to-cache latency entries.

3. The system of claim 2, wherein the latency table is populated with latency entries by transmitting probe messages from a cache in one of the plurality of processing nodes to the cache and the main memory of the remainder of the plurality of processing nodes.

4. The system of claim 1, wherein latencies for memory access requests varies based on an interconnect distance between the plurality of processing nodes.

5. The system of claim 1, wherein a memory access request history is stored at the directory for identifying owner cache lines having coherence statuses to be downgraded.

6. A system, comprising:
a plurality of processing nodes interconnected by an interconnect network, wherein each processing node comprises a cache, a main memory, and a directory, wherein the directory of at least one of the plurality of processing nodes tracks main-memory-to-cache latencies for memory access requests to the main memory and inter-cache latencies for memory access requests to caches containing copies of data cached from the main memory of the at least one of the plurality of processing nodes;
wherein the at least one of the plurality of processing nodes is configured to selectively retrieve data from one of the main memory and the caches based on the directory; and
wherein the directory at each of the plurality of processing nodes further includes a confidence counter to monitor inefficient accesses to an owned cache line, wherein inefficient accesses occur when memory access requests are satisfied using cached copies of data having a higher latency times than a latency associated with satisfying the memory access requests at a main memory in a home node of the cached copies.

7. A processor, comprising:
a latency table to store:
an inter-cache latency associated with memory accesses from a requesting node to a main memory in a home node, wherein the home node stores an original copy of a cache line; and
a main-memory-to-cache latency associated with memory accesses from the requesting node to a cache memory in an owning node, wherein the owning node stores a cached copy of the cache line; and
a non-uniform memory node configured to, in response to determining that the inter-cache latency is higher than the main-memory-to-cache latency, retrieve a copy of data associated with the memory access request from the main memory in the home node.

8. The processor of claim 7, wherein the latency table is populated with latency entries by transmitting probe messages from the processor and measuring a delay from a first time of transmitting the probe messages to a second time of receiving a return acknowledgement from each cache and main memory of a remainder of a plurality of processing nodes.

9. The processor of claim 8, wherein the latency table tracks a plurality of accesses to the owning node and a latency associated with each of the plurality of accesses.

10. The processor of claim 8, wherein the latency table is populated with latency entries by transmitting probe messages from the home node to the requesting node and the owning node.

11. The processor of claim 10, wherein the non-uniform memory node is further configured to:
generate a confidence counter at the home node to monitor inefficient accesses to an owned cache line, wherein inefficient accesses occur when memory access requests are satisfied using cached copies of data having a latency that is higher than a latency associated with satisfying the memory access requests at the main memory in the home node.

12. The processor of claim 11, wherein the non-uniform memory node is further configured to:
change a coherence status of the owned cache line after the confidence counter exceeds a predetermined threshold.

13. The processor of claim 12, wherein:
the coherence status of the owned cache line is changed by sending a downgrade command from the home node to the owning node; and
the downgrade command causes the owned cache line to be written back to the main memory in the home node.

14. A method, comprising:
tracking, at a latency table of each one of a plurality of processing nodes, a list of latency entries representing:
an inter-cache latency associated with memory accesses from a requesting node to a main memory in a home node, wherein the home node stores an original copy of a cache line; and
a main-memory-to-cache-latency associated with memory accesses from the requesting node to a cache memory in an owning node, wherein the owning node stores a cached copy of the cache line; and in response to determining that the inter-cache latency is higher than the main-memory-to-cache latency, retrieving a copy of data associated with the memory access request from the main memory in the home node.

15. The method of claim 14, wherein the latency table of one of the plurality of processing nodes is populated with latency entries by transmitting probe messages from a processor in the one of the plurality of processing nodes and measuring a delay from a first time of transmitting the probe messages to a second time of receiving a return acknowledgement from each cache and main memory of a remainder of the plurality processing nodes.

16. The method of claim 15, wherein the latency table of one of the plurality of processing nodes tracks a plurality of accesses to the owning node and a latency associated with each of the plurality of accesses.

17. The method of claim 14, wherein the latency table of each one of the plurality of processing nodes is populated with latency entries by transmitting probe messages from the home node to the requesting node and the owning node.

18. The method of claim 17, further comprising:
tracking, using a confidence counter at the home node, a number of inefficient accesses to an owned cache line, wherein inefficient accesses occur when memory access requests are satisfied using cached copies of data having a latency that is higher than a latency associated with satisfying the memory access requests at the main memory in the home node.

19. The method of claim 18, further comprising:
changing a coherence status of the owned cache line to a shared state after the confidence counter exceeds a predetermined threshold.

20. The method of claim 19, wherein:
changing the coherence status comprises sending a downgrade command from the home node to the owning node; and
the downgrade command causes the owned cache line to be written back to the main memory in the home node.

* * * * *